(12) United States Patent
Gavrilescu et al.

(10) Patent No.: US 7,397,922 B2
(45) Date of Patent: Jul. 8, 2008

(54) GROUP SECURITY

(75) Inventors: Alexandru Gavrilescu, Redmond, WA (US); Graham A. Wheeler, Redmond, WA (US); Grigori M. Somin, Seattle, WA (US); John L. Miller, Woodinville, WA (US); Rohit Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/608,768

(22) Filed: Jun. 27, 2003

(65) Prior Publication Data

US 2004/0264697 A1    Dec. 30, 2004

(51) Int. Cl.
    *H04K 1/00* (2006.01)
(52) U.S. Cl. ........................................ 380/255; 380/285
(58) Field of Classification Search ...................... 726/6, 726/10; 71/158, 176; 380/255, 285
    See application file for complete search history.

(56) References Cited

U.S. PATENT DOCUMENTS

| 4,924,514 | A | 5/1990 | Matyas et al. |
| 5,805,705 | A | 9/1998 | Gray et al. |
| 6,345,299 | B2 | 2/2002 | Segal |
| 6,347,338 | B1 | 2/2002 | Segal |
| 6,412,070 | B1 | 6/2002 | Van Dyke et al. |
| 6,636,898 | B1 | 10/2003 | Ludovici et al. |
| 6,823,462 | B1 | 11/2004 | Cheng et al. |
| 2002/0166052 | A1 | 11/2002 | Garg et al. |
| 2003/0055892 | A1 | 3/2003 | Huitema et al. |
| 2003/0056093 | A1 | 3/2003 | Huitema et al. |
| 2003/0182428 | A1 | 9/2003 | Li et al. |
| 2003/0204742 | A1 | 10/2003 | Gupta et al. |
| 2003/0212806 | A1 | 11/2003 | Mowers et al. |
| 2004/0034776 | A1 | 2/2004 | Fernando et al. |
| 2004/0111469 | A1 | 6/2004 | Manion et al. |
| 2004/0111515 | A1 | 6/2004 | Manion et al. |
| 2004/0111607 | A1* | 6/2004 | Yellepeddy .................. 713/155 |
| 2004/0162871 | A1* | 8/2004 | Pabla et al. .................. 709/201 |
| 2004/0243827 | A1* | 12/2004 | Aguilera et al. ............. 713/200 |
| 2005/0044411 | A1 | 2/2005 | Somin et al. |
| 2005/0086300 | A1* | 4/2005 | Yeager et al. ................ 709/204 |

\* cited by examiner

*Primary Examiner*—Nasser Moazzami
*Assistant Examiner*—Carlton V Johnson
(74) *Attorney, Agent, or Firm*—Marshall, Gerstein & Borun LLP

(57) ABSTRACT

A system and method for providing security to a graph of interconnected nodes includes a grouping multiplexing layer configured to monitor calls to the system, a graphing dynamic link layer configured to transmit and receive data to and from the graph, and a group security manager coupled to the grouping multiplexing layer and coupled to the graphing dynamic link layer; the group security manager is configured to perform security-related acts via interacting with a group database to propagate security-related information to members of a group within the graph. The group security manager is configured to provide role-based authorization on publication of one or more records and provide membership control for admission to a graph of interconnected nodes. The group security manager provides membership control by providing credentials to potential members of the graph to enable a connection and by providing a governed system for renewal and revocation of members.

6 Claims, 10 Drawing Sheets

FIG. 10
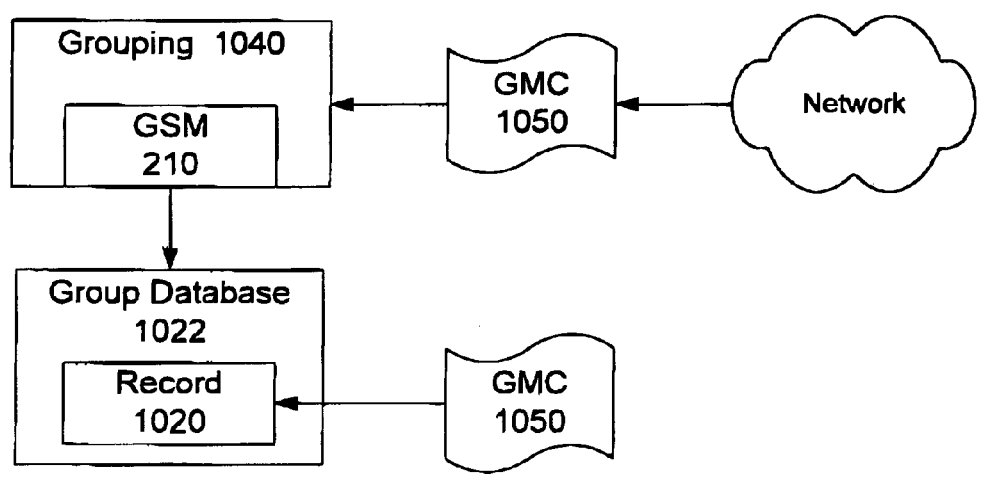
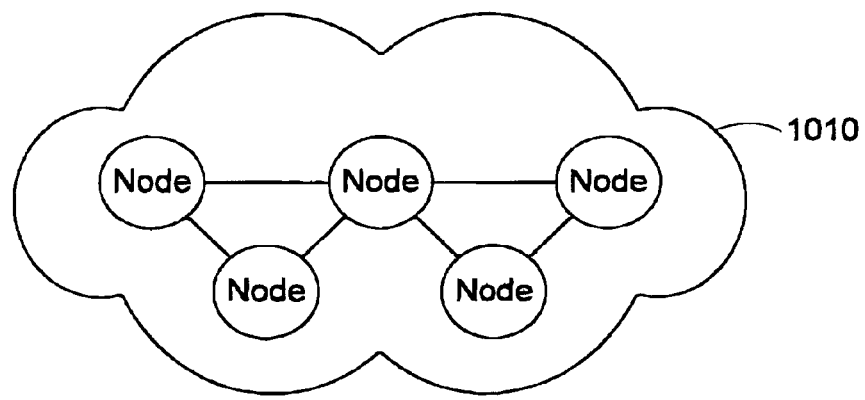

GROUP SECURITY

FIELD OF THE INVENTION

This invention relates generally to computer systems and, more particularly, relates to security for a graph of computer devices.

BACKGROUND OF THE INVENTION

In general, peer-to-peer computing refers to direct sharing of computer resources and services between systems. Direct exchanges of data, processing power and storage can enhance computing power and networking connectivity. Clients and servers can interchange their roles and leverage collective processing and storage power across a group of computers depending on which role is most efficient for the network. As a result, servers and clients can apportion roles and reduce the need for additional storage and the like.

Some types of peer-to-peer infrastructures follow a graphing protocol. A graph is a collection of interconnected peer nodes. A group is an implementation of a graph that also provides security in a graph, and allows sharing of the same graph by multiple applications on the same machine. Peer nodes join a graph to exchange information in the form of records. A basic graphing protocol provides for no control over connectivity among peers and the information published in the graph. The information published can be spoofed or tampered. There is also no control over who can connect to the graph. Malicious users can easily eavesdrop and listen to information exchanged between peers in the graph. Therefore, there is a need for security in peer to peer networks that prevent malicious users, spoofing, tampering and generally provides control over a secure group.

BRIEF SUMMARY OF THE INVENTION

Accordingly, a system for providing security to a graph of interconnected nodes includes a grouping multiplexing layer configured to monitor calls to the system, a graphing dynamic link layer configured to transmit and receive data to and from the graph, and a group security manager coupled to the grouping multiplexing layer and coupled to the graphing dynamic link layer; the group security manager is configured to perform security-related acts via interacting with a group database to propagate security-related information to members of a group within the graph by controlling interactions between group members and a plurality of actions governing the group members. The group security manager interacts with the database to provide security over the graph by controlling revocation and renewal of members of the group as well as interactions between group members and outside networks.

In an embodiment, the group security manager provides integrity of records. More specifically, the group security manager is configured to provide role-based authorization on publication of one or more records and provide membership control for admission to a graph of interconnected nodes. In an embodiment, the group security manager provides membership control by providing one or more potential members of the graph credentials that enable a connection to the graph, and by providing a governed system for renewal and revocation of members.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

FIG. 10 illustrates a block diagram for a group configured to receive published records in accordance with an embodiment of the present invention.

DETAILED DESCRIPTION OF THE INVENTION

Figure 1:
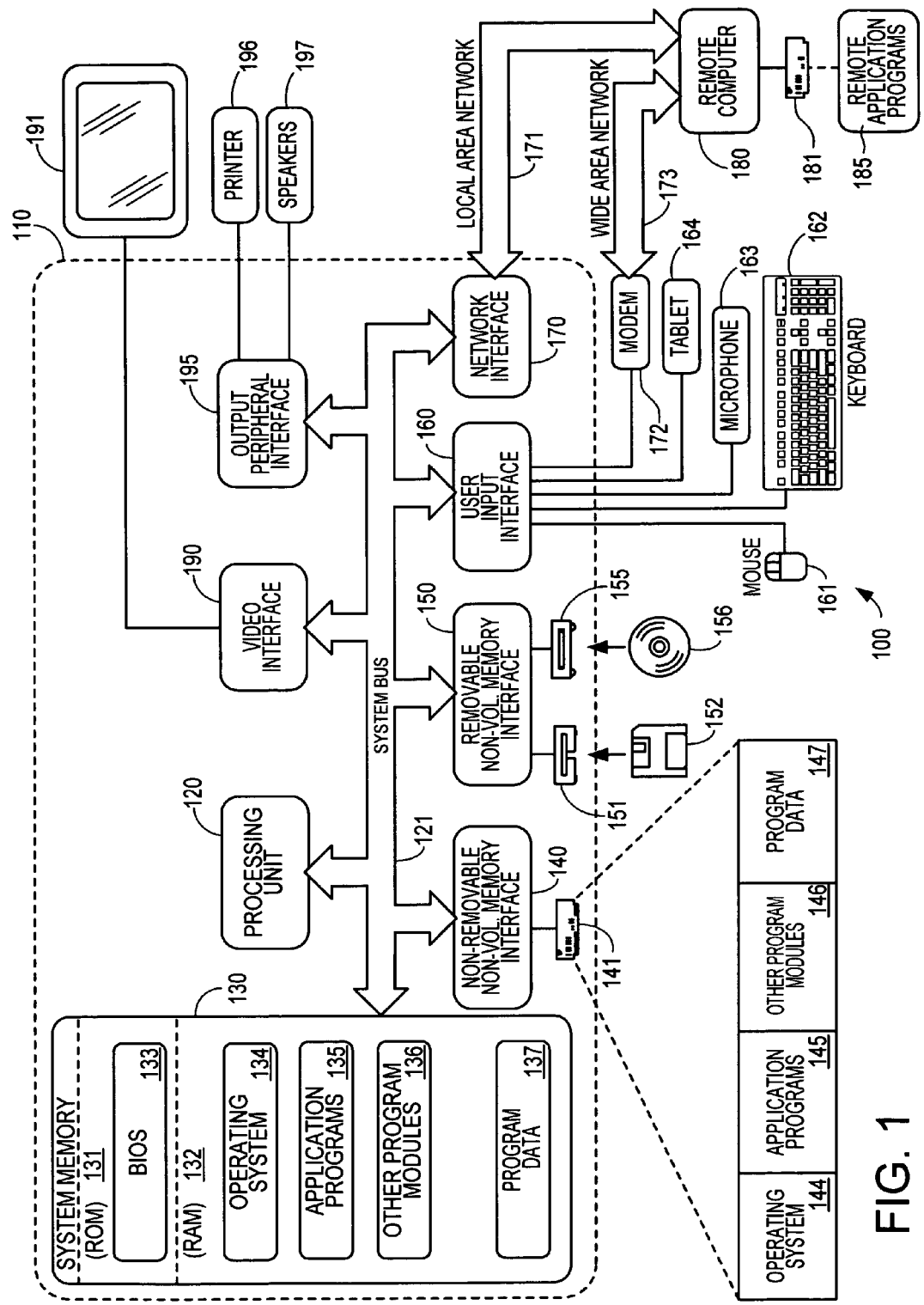
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components, including the system memory to the processing unit 120. The system bus 121 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152 and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a tablet/electronic digitizer 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that several of the acts and operation described hereinafter may also be implemented in hardware.

Group Security

Figure 2:
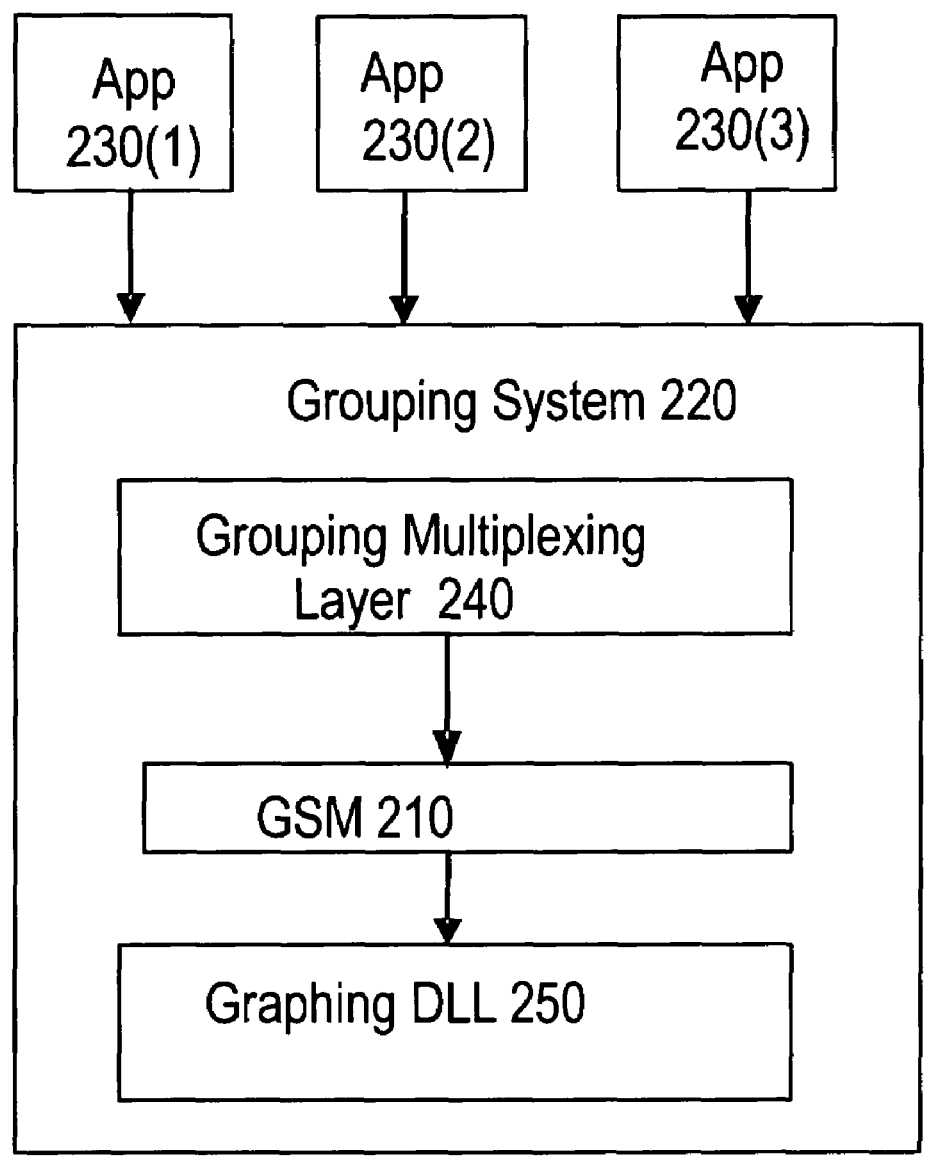
FIG. 2 is block diagram in accordance with an embodiment of the present invention.

Embodiments of the present invention are directed to group security. Group security in this context refers to peer names, group membership certificates, which are the credentials associated with peer names, roles, membership revocation, secure publishing, security policies, and secure connections. Referring to FIG. 2, a block diagram illustrates a group system 200 that implements a group security manager (GSM) 210 for a group within a peer-to-peer collection of computers organized in a group within a graph structure following a graph protocol. For purposes of this disclosure, a graph is a collection of interconnected peer nodes. More particularly, a graph provides that the peer nodes are interconnected such that each peer communicates with a limited number of nodes hence communications propagate through the graph without requiring the originating node to communicate directly with multiple nodes. Peer nodes join a graph to exchange information in the form of records. A record is data maintained in a database. Messages are referred to as data distributed outside of a database. A record contains the publishing member identity, data to prove record validity, and a record payload that contains the information to be shared. There is also a security data field in the record containing security-related information associated with the record. Records have a limited lifetime specified as 'validity time' in the record header.

GSM 210 is responsible for providing security to a group by providing and managing peer names, certificates, revocation of privileges, and secure publishing. GSM 210 interacts with a group database to propagate security-related information to all group members. In one embodiment, GSM 210 acts like any other graph client when publishing data and uses application programming interfaces (APIs) provided by graphing components. GSM 210 can be configured to be responsible for signing group records, validating records that are published, discovering group members, and enabling custom roles, user defined records, and security policies.

As shown, a grouping system 220 is coupled to a plurality of applications 230(1-3). GSM 210 generates several different events that are sent to the applications 230(1-3). GSM 210 generates events regarding certificates, roles and record types as explained in further detail below.

Within grouping system 220, a grouping multiplexing layer 240 resides coupled to GSM 210, such that GSM 210 is between the grouping multiplexing layer 240 and a graphing dynamic link layer (DLL) 250. GSM 210 performs security-related processing. Group multiplexing layer 240 ensures that GSM 210 is called only once per shareable group instance. Group instances are shareable if they have the same group name, peer name, and user context.

Some security resources can be accessed only under a specific user contexts (e.g. private key). Whenever the GSM 210 uses grouping, it does so impersonated as an application.

One exception can be that when graphing calls back into the GSM 210 using the callback interfaces, it can be configured to be GSM 210s responsibility to do appropriate impersonation.

GSM 210 functions to "wrap" APIs that may be exposed by graphing DLL 250. The wrapping refers to adding additional data or doing additional processing to API's exposed by graphing DLL 250 for purposes of security related processing. In one embodiment, GSM 210 exposes only graphing APIs applicable and exposed in accordance with a grouping protocol. Applications 230 can have additional architectures within the scope of this disclosure, including sharing a group and being coupled to two or more groups simultaneously. A node coupled to grouping system 220 can communicate via grouping system 220 by communicating a record.

The GSM 210 provides security to data published according to the graphing protocol and also enables secure connections to be established between peers in a graph. GSM 210 enables peers in a graph with different capabilities to have different privileges with respect to other peers.

The GSM 210 provides security for a group within a graph by requiring each node in the group to have a secure peer name. In this context, a secure peer name is secured by being derived from a public key that is part of a public/private key pair. The GSM 210 uses a secure peer name to identify each member of the group. The secure peer names provide a statistically unique identification while a malicious user without the corresponding private key cannot forge ownership of a peer name.

In one embodiment, GSM 210 uses a secure peer name to identify a group. When a group is created, a new public/private key pair is also created and the group secure peer name is based upon it. Anyone who owns the private key corresponding to the secure peer name of the group is considered a group owner, as they have total control of the key used as the group authority.

GSM 210 provides that a group can have members. Each group can have a group identifier that is unique for the scope of operation of the group. A group ID differentiates between different groups that are present on local machine and also for identification of groups between different peers. Groups can use peer names as group ID's.

According to an embodiment, GSM 210 further requires membership credentials to participate in a group. The credentials prove membership in the group. In the embodiment, credentials used to prove group membership are X.509 certificates known as group membership certificates. Every group member has a group membership certificate to prove membership when connecting to a group or when publishing in a group.

The group security system enables secure publishing by protecting a group database containing information published by group members by providing security through integrity and authorization for secure publishing. Integrity is provided by requiring records published in the group to carry security data. The security data contains the cryptographic signature of the record contents, which can include payload and parts of the header. The cryptographic signature can enable detection of record tampering. Only explicitly authorized group members can update records published by other group members without making those records invalid.

Another security feature added by the GSM 210 concerns authorization. Not all members are authorized to publish all kinds of records and not all members are allowed to update records published by other group members. Therefore, according to an embodiment, there is a requirement to check for authorization that the publisher had the right to publish records and that the signer had the right to sign the record. This authorization is done against the privileges that the publisher and signer have.

The connections between peers in the group are secured. For securing these connections, a Security Support Provider (SSP) is used. The SSP uses group member certificates (GMCs) to prove membership in a group. All the information exchanged between two connected peers is secured by cryptographically encrypting it and signing it.

Membership credentials have validity period associated with them, during which these credentials will be valid. To continue participation in a group, these credentials have to be renewed before they expire. Only members having a specific role that allows them to issue GMC to other members can renew GMC's. There are two mechanisms that can be used for performing renewal. A first, renewal method is an online renewal. Online renewal involves connecting to another group member and requesting a GMC. The group member should have authorization to issue GMC to other group members.

Another renewal method is an offline renewal. Offline renewal involves publishing a request to renew the GMC in graph database. When some member receives this request if authorized to issue GMC's, the member can respond to it by updating the request for renewal.

Membership in a group does not guarantee authority to perform each function within the group. Rather, group members can have different privileges. The different privileges are assigned according to roles that define privileges for different classes of group members. Each member can have one or more roles in the group. There can be a set of privileges associated with each role. In one embodiment, each role is identified by a friendly name and a unique identifier, which can be a globally unique identifier, known as a role identifier. No two roles can have a same friendly name or the same role identifier. In a secure group, participation is restricted to a set of users known as group members. Every group member has an identity. A member identity is a unique peer name. Member identity ownership is proven via associated credentials.

GSM 210 enables a role hierarchy that governs the ability to publish, modify and delete records. At the top of the hierarchy is a record containing security related information. The security related information includes information about different rights associated with a given role. The information also includes the type of records that can be published in the group. The members authorized to modify these records can grant themselves privileges to perform any operation in the group.

When some information is published in the group, an embodiment provides for access checks to be performed to ensure that the publisher of the information has the required rights. The access checks are done by creating a token for the publisher. The token contains information about the roles of the publishers. Roles are included in the credentials given to every member of the group. The token is then matched against the security descriptor for the record published. The security descriptor is basically a list of rights associated with each role. The format of these security descriptors can be the same as a Windows native security descriptor. For an embodiment that has a format of security descriptors that matches a Windows native security descriptor, model peer names and roles are mapped into Windows security SID's.

Another embodiment is directed to deferred record validation. To perform access checks, different security related information has to be available for members' credentials and security descriptor for the record type and the like. The security related information can be published in the graph database. There is no guarantee that a member will have all information available. To overcome this limitation, the embodiment defers validation if all the required information is not available. Once the required information becomes available, the GSM 210 informs a graphing protocol that particular record(s) can be validated. Graphing then resubmits this information to the GSM 210 for validation.

Membership credentials can be X.509 certificates. The X.509 certificates are issued by authorized members in the group. More specifically, GSM 210 extends the public/private key pair by deriving peer names from the public key. The peer names derived from public keys are known as secure peer names. Insecure peer names are also defined in peer networking, but these are not used by grouping. For the remainder of this document, 'peer name' refers exclusively to secure peer names.

A peer name, according to an embodiment, can be between 40 and 190 characters long. A peer name is considered owned by the person having the corresponding private key. Ownership can be proved via a cryptographic challenge. If a challenge is encrypted with a public key, only the entity holding the private key can give a valid response.

Group security uses a peer name to identify each member of the group. Peer names provide statistically unique identification, and ownership of a peer name cannot be forged by a malicious user without the corresponding private key.

GSM 210 also uses a peer name to identify a group. When a group is created, a new public/private key pair is also created and the group peer name is then based upon it. Anyone who owns the private key corresponding to the peer name of the group is considered a group owner, as they have total control of the key used as the group authority.

According to an embodiment, to trust the credentials, the credentials of the authorized member issuing the credentials are first determined to be trusted credentials. Similarly, to trust the credentials of the authorized member, the issuer of its credentials are first determined to be trustworthy. At the top of this trust chain are credentials that are issued by some trusted member to itself. GSM 210 issues credentials to itself that are trusted by all the group members. As one authorized member can issue credentials to another member that can issue credentials to more members. Thus, the chain can grow very large. Heuristics are applied to keep this chain short. These heuristics are applied to the two renewal mechanisms.

For online renewal, two heuristics are applied. First, authorized members are contacted that have a shorter chain before contacting members with longer chains. Second, renewal attempts are performed for getting a shorter chain, not only to get longer lived credentials. The number of such attempts will be proportional to the length of the chain.

For offline renewal, several heuristics apply. First, if the chain grows too large, then offline renewal is performed to shorten the chain. Second, even if a renewal request has been processed by some authorized members, if shorter chain can be given, the request can be processed again. Third, there can be cases in which more than one authorized member is active in the group. In this case, both the members may try to process the renewal request. To avoid clashes, every member can have random back-off before trying to process the renewal request. This random back-off will be proportional to the length of the chain that an authorized member has.

The X.509 certificates are referred to as group membership certificates (GMCs). To participate in a group, every user must have some credentials that can be used to prove his membership. The credentials used to prove group membership are X.509 certificates known as group membership certificates or GMC's. Every group member has a GMC they use to prove their membership when connecting to a group, publishing in a group, etc.

GMCs provide a peer name identifying a member. To prove ownership of a GMC, a presenter proves that he owns the peer name contained in the certificate. Ownership of the peer name is linked to owning a private key corresponding to the peer name. Therefore, a member provides credentials that can be easily verified using a simple challenge. In an embodiment using a trusted X.509 certificate, the certificate chain leads to a self-signed root certificate whose authority is trusted. For a GMC to be trusted, it can be a leaf descended from a trusted authority. Using peer names for identification simplifies this problem, because every group has a public/private key pair, and the group peer name is cryptographically related to this public/private key pair.

A group is identified by the group's peer name. A group peer name can thus be trusted, and hence, can act as a trusted authority that can issue X.509 certificates. A group peer name can be used as the root authority. Further the key used to sign the root certificate can be verified as a group's private key. Hence, any certificate chain that leads to the self-signed root certificate with group as authority can be trusted.

According to an appropriate data structure, a root certificate should contain subject: group peer name, issuer: group peer name, and be signed by group private key. Such a self-signed root certificate is known as a group root certificate (GRC).

In X.509 certificates, authority to issue certificates can be delegated to trusted sub-authorities. GSM 210 also delegates authority to trusted sub-authorities to distribute the load of issuing member GMC's to additional trusted group members, referred to herein as administrators. Administrators can further delegate this responsibility, if authorized by the group's security policy.

Like any other X.509 certificate, GMC's have a validity period. A GMC is considered invalid any time outside that validity period. For a group member to maintain his membership, he has to renew his GMC before it expires.

According to an embodiment, not all members in a group necessarily have the authority to perform all functions. Group members can have different privileges. In the embodiment, "roles" are provided as a mechanism for assigning privileges to a class of group members. Each member has one or more roles in the group. Each role can be associated with a set of privileges. Each role can be identified by a friendly name and a unique identifier known as role ID. In the embodiment, no two roles can have same friendly name or the same role ID.

The roles assigned to a member are listed in the member's GMC to ensure that member does not change roles. In the embodiment, the certificate is signed and any modification can be detected. An administrator or other group members authorized to issue GMC's cannot grant a given role unless authorized by the group policy.

Role information contains information associated with a role. Role information must be available to all group members so that they can use the role information to ensure group security. Members exchange information by publishing role information in the form of records in the group. Role definitions are exchanged the same way. Role records containing all the information related to roles are published in the group. These role records are published by the member who created the role. A group member who is authorized to modify roles can modify a role record to change the set of privileges or other information.

Events

The events referred to above that pass from GSM 210 and applications are now further explained. Different events occur which enable information about a certificate to be passed with or without event data. As one of skill in the art appreciates, the events described herein are exemplary only and subject to design requirements. The PEER_GROUP_EVENT_MEMBERSHIP_AUTHORIZATION is an event that could be passed to transfer information about a certificate and event data. Another event could be a PEER_EVENT_ISSUE_GMC sent when an administrator needs to issue a GMC. When an application calls for data, using, for example, a data structure such as PeerGetEventData( ), the data returned is a CERTIFICATE_INFO structure in self-relative format. The event PEER_EVENT_NEW_ROLE is an event sent when a new role record is received. When the application calls PeerGetEventData( ), the role ID is returned. The role ID can be used to retrieve extended role information. There will be an event for new roles and new record types. For example, one event could be called a PEER_EVENT_NEW_RECORD_TYPE event sent when a new record type is defined. When an application calls PeerGetEventData( ), the record ID is returned. The record ID can be used to retrieve extended record information.

Membership Revocation

Each member in a group can be subject to revocation. In an embodiment, there can be a plurality of revocation methods. One method can be via secure peer names in which a revoking source communicates that a particular peer name is revoked and should not be allowed to participate in the group. This can be done by publishing a revocation record. Another method of revoking a member can be via a serial number. Using a serial number obviates the non-scalability of revocation by peer names. That is, if there is very high revocation rate in the group, there will be a lot of overhead of these revocation records. To avoid excessive overhead, an embodiment is directed to employing scalable revocation bitmaps. Every group member certificate can have a serial number. Each serial number in an embodiment corresponds to a bit in a revocation bitmap. To revoke a given serial number, an administrator publishes a new revocation bitmap with the bit corresponding to that serial number set.

Regarding the method using peer names, according to an embodiment, all the members are notified that a particular peer name is revoked and should not be allowed to participate in the group anymore by publishing a revocation record. The type of revocation record that notifies the group contains the peer name of the user that has been revoked. The revocation record should not be present in the group database for an infinite time; otherwise there will be a stale record for every group member which has ever been revoked. To avoid this revocation record is published with validation time sufficient enough to ensure that the current GMC of the revoked group member expires before the revocation.

To instigate a revocation of a member, an application can ask GSM 210 to revoke a particular group member and provides the peer name of that group member as input. Next, GSM 210 constructs a revocation record that contains the peer name of the revoked group member and appropriate flags.

A simple revocation applies to unprivileged group members, but might cause severe side-effects when used on administrators. If an administrator is revoked, then all the GMC's issued by the administrator become invalid. Also, all the security records published by that administrator become invalid. To avoid this problem, administrators are first deprecated and then revoked. To distinguish deprecation record from normal revocation record, a flag is set in the revocation record. This flag is valid only in the case of deprecating an administrator. For all other revocation records this flag is ignored.

A revocation record like all records can be deleted by a sufficiently privileged user. Once the revocation record is deleted, the group member is not considered as revoked. Therefore, there is a lifetime of a revocation record which should be longer than the maximum GMC lifetime so that the GMC of the revoked member expires before the revocation does and he is not able to enter the group again. Also, if the maximum lifetime of the GMC is reduced, there can be situations in which the revocation record is not published long enough to guarantee GMC expiration. To solve this problem in case maximum GMC lifetime is changed, the record type containing information about a revocation record can be updated to reflect a new maximum lifetime, and the time when this change will become valid. In one embodiment, the update is a time difference between earlier and the new lifetime.

Another method of revocation uses serial numbers. One of the obvious disadvantages of revocation using peer names is that it is not scalable. If there is a very high revocation rate in the group, overhead will be extensive for the revocation records. To avoid this, an embodiment is directed to a scalable scheme of revocation bitmaps. More specifically, every GMC has a serial number. Each serial number corresponds to a bit in a revocation bitmap. To revoke a given serial number, an administrator publishes a new revocation bitmap with the bit corresponding to that serial number set or not set, depending on how the bitmap is configured. When validating a GMC, the serial number in the GMC is checked for revocation.

An administrator can have multiple revocation bitmaps. Each bitmap published by the same administrator can cover mutually exclusive sets of serial numbers. To determine an exclusive set, according to an embodiment, a starting serial number is generated randomly and checks are made to ensure the new serial number does not collide with an already existing range of serial numbers.

A new revocation bitmap can be created when required, for example, when issuing a new certificate on a machine for the first time. An administrator can be logged on from different machines at the same time. To ensure that same administrator does not issue more than one GMC with the same serial number, GSM 210 maintains a separate revocation bitmap with a unique range for each machine from which GMC's are issued. On each machine, the last serial number issued by the administrator is stored as a GMC extended property in the certificate store maintained by the identity manager. This stored serial number allows an administrator to logon from the same machine and start issuing certificates from the last serial number that it issued in the previous session.

Revocation can be an exception, rather than the rule. When a GMC is renewed, the serial number of the older certificate is not revoked unless the old GMC contains roles that are not in the new GMC.

Revocation of a GMC by serial number is equivalent to revocation of membership only if the member has a single GMC. Because it is possible that the member has multiple GMC's, revocation using serial numbers is revocation of only a GMC and roles associated with the revoked GMC, not revocation of membership.

For a GMC to be valid, none of the subjects in the chain leading from the GMC to the root of the certificate chain can have been revoked. Revocation for administrators can also be performed, but can be complicated. Once an administrator is revoked, all the certificates that are issued by the revoked administrator become invalid, which can cause problems. To avoid problems, the group can implement a concept of administrator deprecation. Deprecation is a notification mechanism which allows all the members who have been issued a certificate by the revoked administrator to realize that the administrator is about to be revoked. Members can then contact other non-deprecated administrators and renew GMC's.

Figure 3:
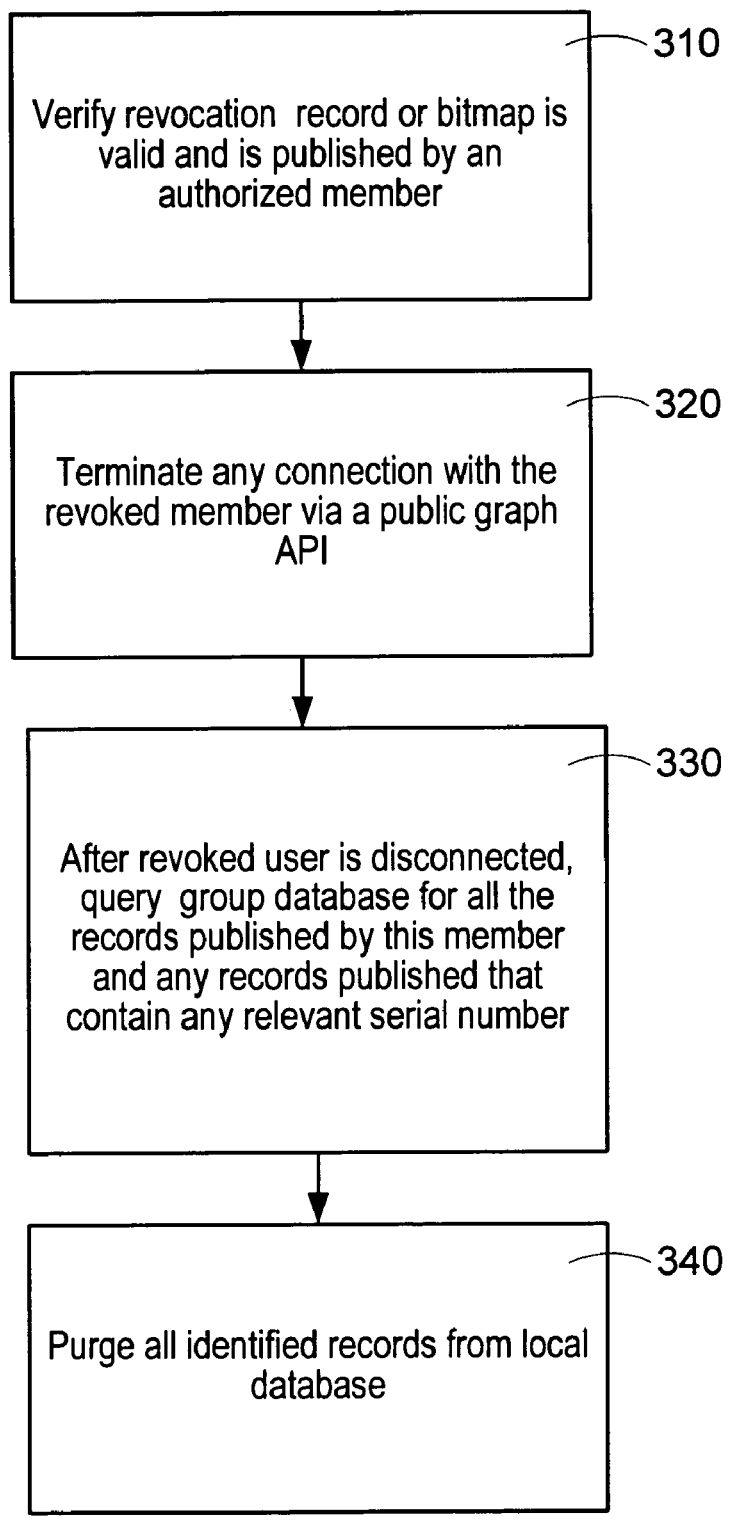
FIG. 3 is a flow diagram of a method for revocation in accordance with an embodiment of the present invention.

Referring to FIG. 3, a flow diagram illustrates a method for GSM 210 when a revocation record is received. Block 310 provides for GSM 210 to verify that the revocation record or bitmap is valid and is published by an authorized member. Block 320 provides that if the revocation refers to a peer name, GSM 210 terminates any connection with the revoked member via a public group API. Block 330 provides that after the revoked user is disconnected, GSM 210 queries the group database for all the records published by this member and any records published that contain the corresponding serial number. Block 340 provides that GSM 210 purges all these records from a local database. GSM 210 does not propagate the deletion to other group members, on account of each one of them should ideally receive the same revocation record and should do processing in the same manner.

Block 350 provides that if revocation is by serial number, GSM 210 deletes only the records published using that serial number.

There are two APIs that are directed to revocation. More specifically, SecRevokeGroupMember is an API to revoke a particular group member using either the member's peer name or their GMC serial number. SecDeleteRevocation is an API used to delete the revocation of a group member. The SecDeleteRevocation API can be used only if the member was revoked using a peer name. Deleting a revocation does not restore records that the group member published before they were revoked. For a member that has been revoked using a serial number, issuing another GMC should allow the member to participate in the group again.

Figure 4:
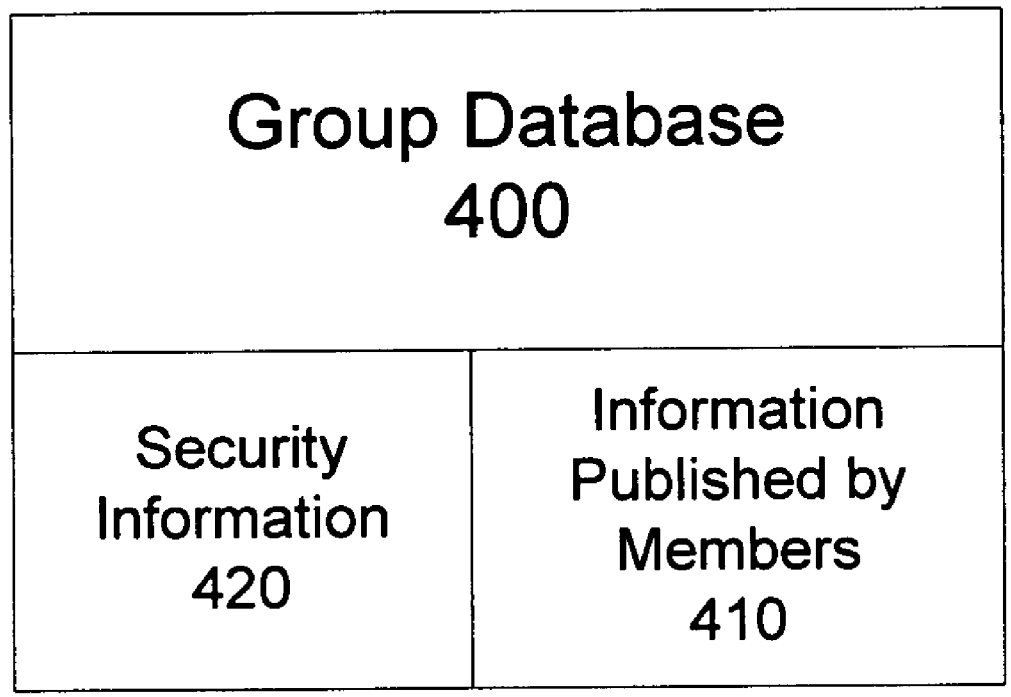
FIG. 4 is a block diagram of a database in accordance with an embodiment of the present invention.

Another embodiment of the invention is directed to secure publishing. Referring to FIG. 4, a group database 400 is configured to contain information published by group members 410. As shown, database 400 also holds security information 420. In an embodiment, GSM 210 provides integrity and authorization for both regular and security-related information to ensure security for both types of information to insure secure publishing.

Figure 5:
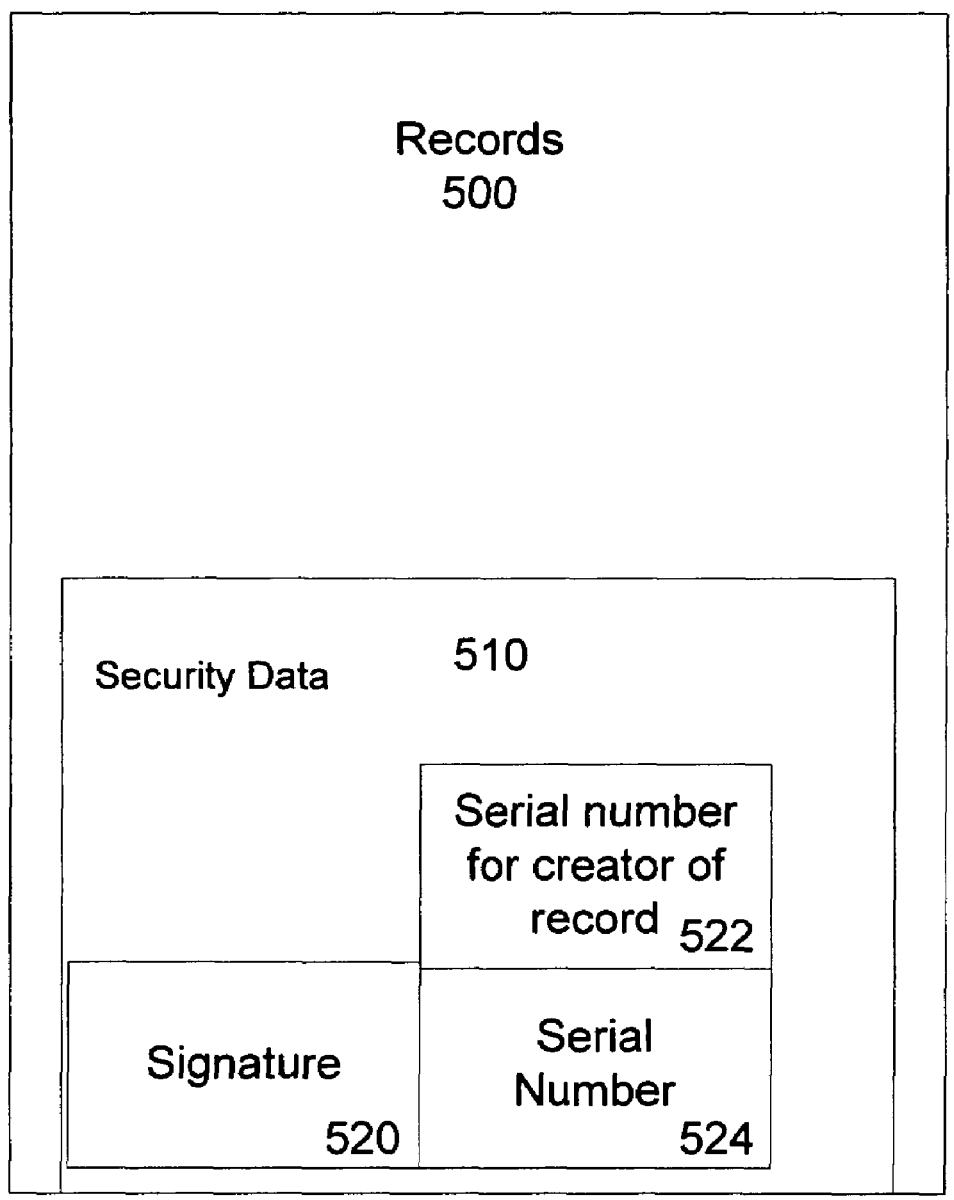
FIG. 5 is a block diagram of a record in accordance with an embodiment of the present invention.

Regarding integrity, FIG. 5 illustrates that records 500 that are published in the group carry security data 510. The security data 510 contains the cryptographic signature of the record contents 520, which can include payload and parts of the header. The signature 520 enables detection of record tampering. Only explicitly authorized group members can update records published by other group members without making those records invalid.

Regarding authorization, not all members are authorized to publish all kinds of records and not all members are allowed to update records published by other group members. Therefore, GSM 210 checks for authorization that a publisher had the right to publish records and that the signer had the right to sign the record. The authorization is done against the privileges that the publisher and signer have.

The signer information included in security data 510 includes signature 520 of the signer 522. In an embodiment, the GMC serial number for the creator of the record 522 is included in security data 510 and the GMC serial number of the modifier of the record 524 is included. As roles present in the GMC give authority to publish records, serial numbers 522 and 524 can be included along with other security data to ensure that verification of authorization is done against the right set of roles. In one embodiment, a single group member can have multiple valid GMC's. For example, a group member can have multiple GMC's if a GMC with different roles is issued to a member before their current GMC expires.

Regarding publishing of a GMC, a GMC contains most of the information required for any verification that needs to be done for that group member, such as public key for signatures and roles for authorization and the like. Verification of information published by a group member requires that group member's GMC. Thus, a group member, in one embodiment, publishes their GMC before publishing any other information in the group. By first publishing a GMC, others can verify information that the member publishes against the published GMC. Further, if the user's current GMC is already published, the GMC does not need to be published again when publishing additional records.

In one embodiment, behavior of the group can be controlled by a group creator. For example, a creator can chose to control whether administrators can make other users administrators and the like. Control can be provided by different configurable security policies. During any kind of verification, these security policies are consulted before doing any further complex cryptographic checks.

Secure connections are established between a graph's members using SSPs. The credential used for establishing connection is the GMC of the group member. A member's GMC chain can be renewed and locally deposited as part of normal operation of establishing a connection.

Peer To Peer Name Resolution Protocol For Discovery

In one embodiment, GSM 210 uses PNRP for discovery of other group members. PNRP provides support for registering and resolving peer names. GSM 210 registers the local peer name in PNRP so that other group members can discover it. PNRP ensures that only authorized group members can register in PNRP.

In another embodiment, PNRP resolution is performed by group multiplexing layer 240. GSM 210 enables publishing using PNRP by providing a list of classifiers to GMCs that are being issued. The classifiers enable members to publish themselves as participates in a predetermined group. GSM 210 can be configured to enable administrators to create a new peer name by appending a classifier to a group peer name. Thus, a newly-constructed peer name can be published using PNRP. One benefit of enabling PNRP publishing is to enable publishing of resources in a group.

Group Security Data Management

Referring now to FIG. 2 and FIG. 4, GSM 210 uses the group database 400 for storing security related information. GSM 210 and group database 400 operate to allow every group member to receive security information when published or during synchronization. Each group member can persist the group database on a predetermined secondary storage. When information is required from database 400, it is retrieved from a disk. The retrieval results in time consuming queries for security related information from the group database when required. GSM 210 in one embodiment maintains a cache of security information when a group is being used, which can be in either online or offline mode.

To maintain security information, records have a limited lifetime, after which they are invalid. GSM 210 should take care that it removes all the stale entries from the record cache periodically and also verify that data is still valid before actually using it.

The security related information maintained by GSM 210 includes membership records, revocation records, revocation bitmaps, administrator invitation keying material, default lifetimes, role records, security policies, and information about all record types. GSM 210 caches this information. Any information that is published in the group database 400 and received by the grouping service flows through GSM 210. The flow-through of records allows validation of received records, and enables securing of locally published records.

Because of the expense to maintain security-related information for all groups at all times, GSM 210 maintains information only for groups that are active. To know when the groups are active and when they are not, GSM 210 needs explicit calls from the grouping service. GSM 210 considers the same peer name under different user contexts as different identities.

GSM 210 exposes several application programming interfaces (APIs). The APIs include SecCreateGroup, SecJoinGroup, SecOpenGroup, and SecCloseGroup.

SecCreateGroup API is used by grouping system 220 to indicate to GSM 210 that a new group has to be created. GSM 210 then internally creates information related to the new group.

Figure 6:
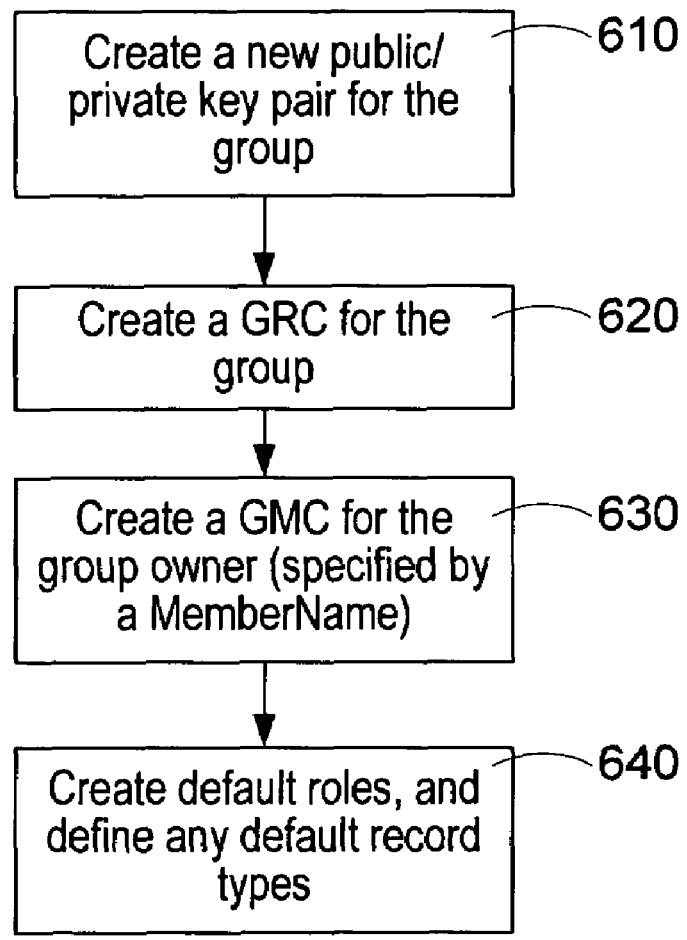
FIG. 6 is flow diagram of a method for creating a group in accordance with an embodiment of the present invention.

Referring to FIG. 6, a flow diagram illustrates a method for creating a group context for a new group. Block 610 provides for GSM 210 to use an identity manager to create a new public/private key pair for the group. Block 620 provides for GSM 210 to use an identity manager to create a GRC for the group. Block 630 provides for GSM 210 to use the identity manager to create a GMC for the group owner (specified by a MemberName). Block 640 provides for GSM 210 to internally create default roles, and define any default record types, if required.

A newly created group has a new group identifier. The new group identifier is statistically unique. In the statistically unlikely event that a group with that name and key already exists, local groups available for the user are checked for collision of group identifier.

The SecJoinGroup API is called to join an existing group. For example, when a user gets an invitation, and wants to join the group.

The SecOpenGroup API is used to open an existing group. The API is called when a client has already created or joined a group and, therefore, already has the credentials required for connecting to the group on a local machine. The credentials for this group will already be present on the machine. GSM 210 retrieves these credentials from an identity manager and initializes grouping to open this group.

The SecCloseGroup API is used to indicate to GSM 210 that a group is now inactive, and the security information should not be cached anymore. Flags can be set to indicate additional processing that needs to be done while closing. In the case of a group owner, SecCloseGroup deletes information such as the group public/private key. In the case of a group member, SecCloseGroup deletes information such as credentials for participating in the group. This API is used to specify that the group has to be closed and no more group information needs to be maintained. Once this function is called, hSecGroup becomes invalid.

SecCloseGroup API can be configured so that it is not called twice for the same group handle. The API SecDeleteGroup provides for deleting local information like the credentials for the group, the local database and the like. Once the group information is deleted from the local machine, the member cannot connect to the group from this machine without re-joining the group.

Membership Renewal

There are two ways in which the GSM can try to renew the GMC of the group member, online renewal and offline renewal. The method can be selected based upon the security policies for renewals and the remaining lifetime of the GMC. Security policies control if GSM 210 is configured to support online renewal, offline renewal or both. Also, there can be some default lifetimes related to a GMC. The lifetimes can specify how long before a GMC expiration that GSM 210 should try to renew the certificate. For example, if GMC's are issued for 30 days, a group can have a policy that says try online renewal two days before the GMC expires and offline renewal one day before the GMC expires.

Figure 7:
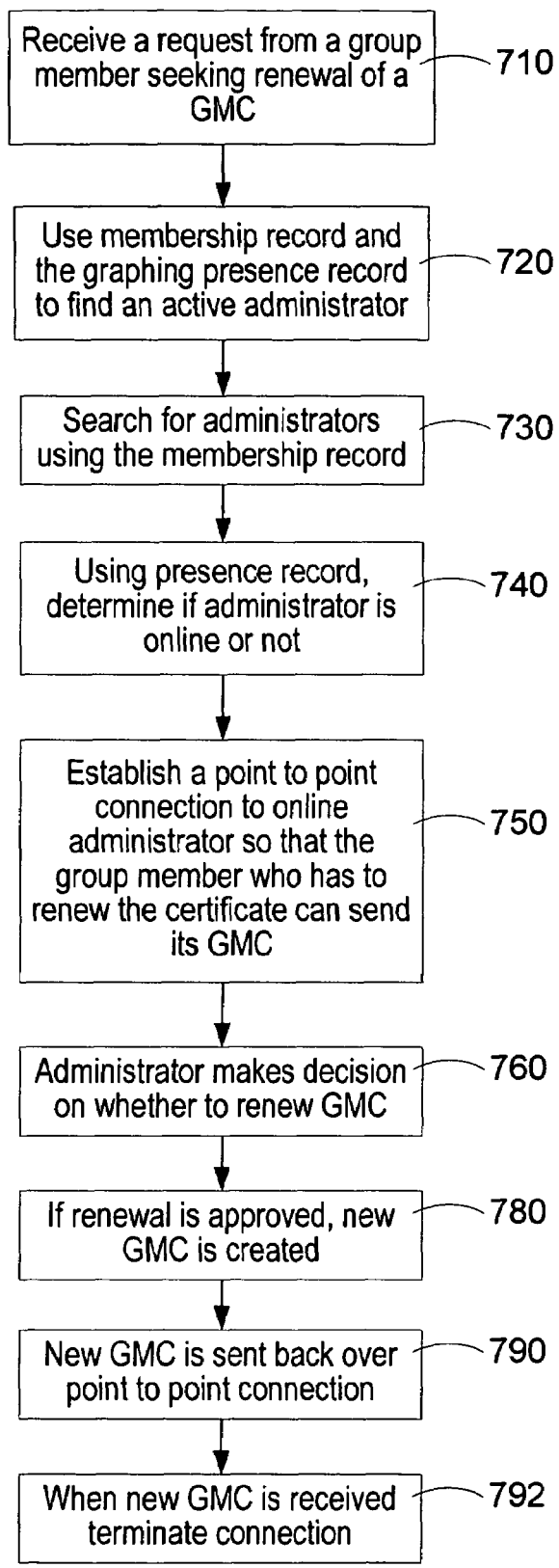
FIG. 7 is a flow diagram for a method of renewing a certificate online in accordance with an embodiment of the present invention.

Referring now to FIG. 7, a flow diagram illustrates a method for performing online renewal. Block 710 provides that GSM 210 receives a request from a group member seeking renewal of a GMC. GSM 210 maintains internal timers to initiate renewal of group member's behalf. Block 720 provides that GSM 210 uses membership record and the graphing presence record to find an active administrator. Block 730 provides that GSM 210 searches for administrators using the membership record. For a given administrator, block 740 provides that GSM 210 then determines using the presence record if that administrator is online or not. If that administrator is online, block 750 provides that GSM 210 establishes a point to point connection to that administrator so that the group member who has to renew the certificate can send its GMC. Block 760 provides that an administrator makes a decision on whether to renew the GMC. If renewal is approved, a new GMC is created in block 780. The new GMC is then sent back over a point to point connection according to block 790. Block 792 provides that when a new GMC is received, the point to point connection is terminated. The initiator closed the connection. If the connection is inactive for some time, or any error occurs, the connection is closed. In case one connection is not successful, the group member can try to connect to other administrators for renewal.

Figure 8:
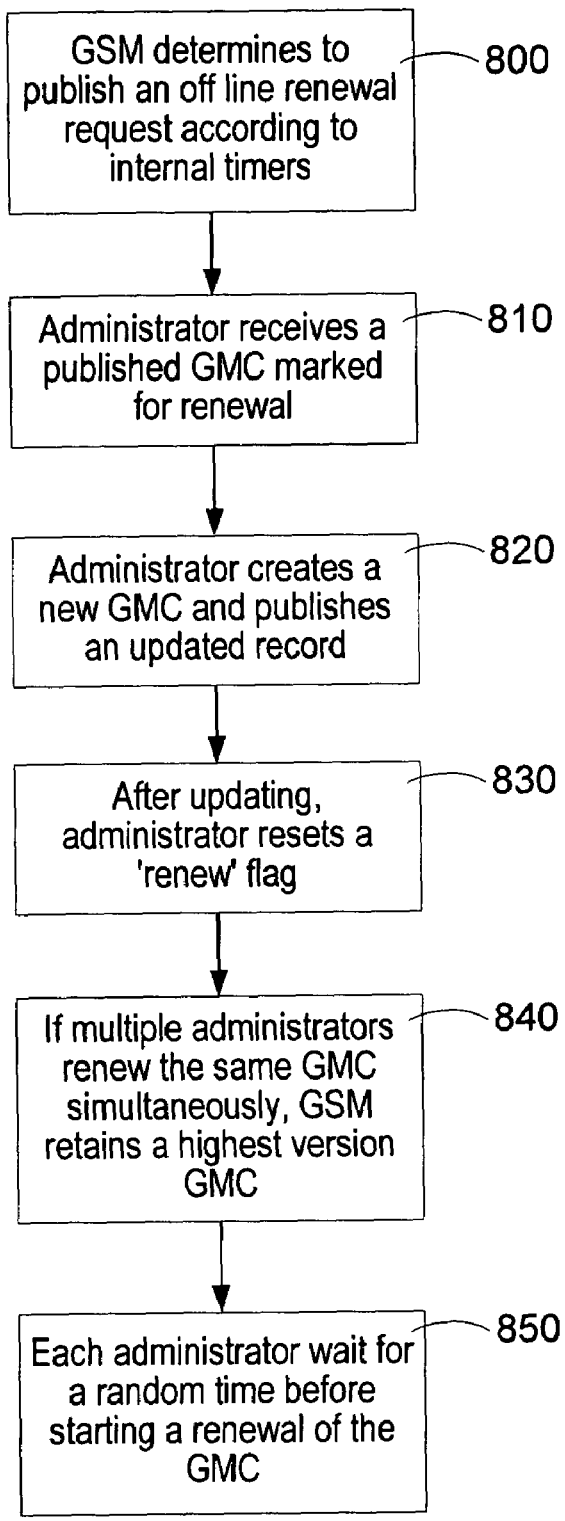
FIG. 8 is a flow diagram for another method of renewing offline according to an embodiment of the present invention.

Referring now to FIG. 8, a flow diagram illustrates a method for offline renewal. Offline renewal is another way in which GMC's can be renewed. This offline renewal requires publishing the current GMC in the group database and marking it for renewal. More specifically, block 800 provides that GSM 210 determines to publish an offline renewal request according to internal timers. Thus, to start offline renewal a GSM publishes a record marked for renewal for the group member. Block 810 provides that an administrator receive a published GMC marked for renewal. Block 820 provides that when an administrator receives the published GMC record, the administrator creates a new GMC and publishes an updated record. Block 830 provides that once the GMC is updated, the administrator resets a 'renew' flag. Block 840 provides that if multiple administrators renew the same GMC simultaneously, GSM 210 retains a highest version GMC. Block 850 provides that each administrator wait for a random time before starting a renewal of the GMC.

There are two callback APIs that are related to offline renewal that are provided to SSP. SSP can request GMCs of a remot prty from GSM 210, also SSP can provide new GMCs for a current group member. One exemplary API is a SetOfflineRenewalCertificateCallback API called by the SSP to store a new GMC. The SSP is the one that receives a renewed GMC during connection establishment.

Another exemplary API is a GetOfflineRenewalCertificateCallback API called by the SSP to get an offline renewed record for the remote party. GSM 210 searches for an offline renewal record in the group database and returns the record as a datablob. GSM 210 provides the record only if the record is renewed.

Before creating or renewing a GMC, an application might require programmatic control over who is issued a GMC and who is not. To provide this kind of control, an application running with a group administrator member identifier can be configured with the option of being informed every time a GMC renewal request is received. For example, in a group with membership fees, the group application running on the administrator's machine would like to control renewal so that it doesn't renew membership of members who haven't paid their dues.

A GRC can be configured as an X.509 certificate with an expiration time. If GRC expires during the lifetime of the group, then all the GMC's will become invalid. To avoid this situation, GRC are created with very high lifetime. Because of there high lifetime, GRC's in one embodiment are configured to not be renewed.

There are several APIs that support the GRCs. The SecCreateCertificate API is used for creation of a certificate. The certificate can be an invitation or a GMC. An invitation is given out to invite some user to join the group. A user who has been invited can use this invitation to participate in a group until receiving a GMC. Before issuing a new certificate, GSM 210 validates certificate data, that the issuer has the right to issue a certificate and that the member to whom the certificate is being issued has not been revoked. If any of the validation fails, then the certificate is not issued.

If all the validation completes successfully and an application registered for receiving PEER_GROUP_EVENT_

MEMBERSHIP_AUTHORIZATION, the event is sent to the registered applications via grouping. The certificate information is passed as the event data so that each application can look at this information and make an appropriate decision. The application will then call SecAuthorizeCreateCertificate to communicate its decision to GSM 210.

Whenever a GMC is issued, it will contain a new serial number. Internally, certificate creation can also handle renewal. For renewal, there is a slightly different processing done:

There is additional validation done to make sure that the GMC is ready to be renewed. For example, in one embodiment, a certificate can only be renewed only after 80% of its lifetime is passed, then anytime a client tries to renew the certificate before this time validation fails.

If security policies allow offline renewal, then the GSM 210 searches in the database to see if there is already a renewed certificate corresponding to this user present in the database. If a renewed GMC is found, it is returned automatically by the GSM 210 rather than generating a create certificate event.

Before finally creating the certificate, the GSM 210 updates the older certificate that is passed as input, updating the validity time, etc.

The SecAuthorizeCreateCertificate API is called by an application via grouping layer to instruct GSM 210 to issue a requested certificate. The application should call GSM 210 after making the decision whether or not the decision is affirmative or negative. The SecCreateInvitation API is called by an application via grouping layer to instruct GSM 210 to issue an invitation.

Figure 9:
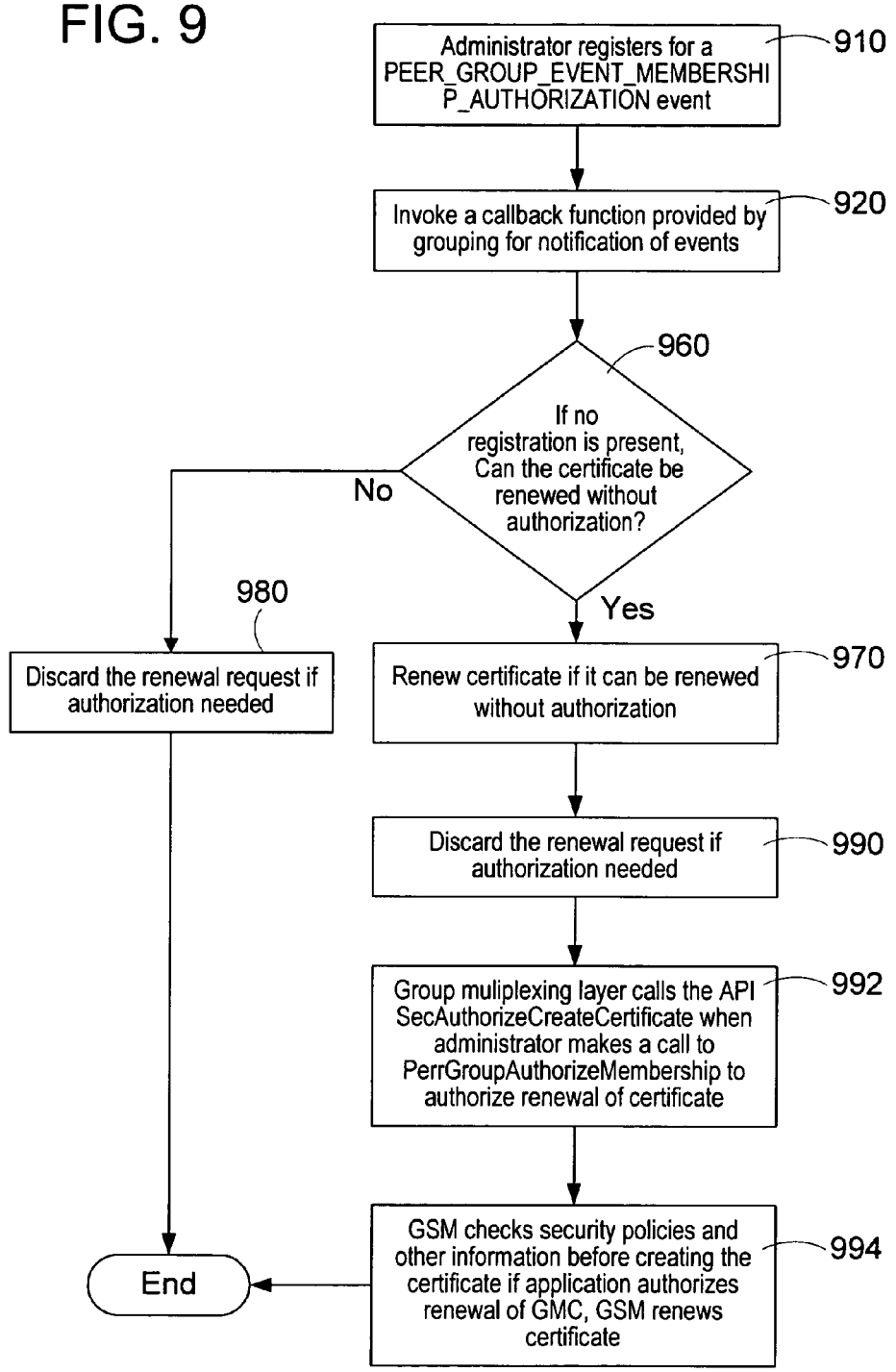
FIG. 9 is a flow diagram illustrating an interaction with a user prior to renewing a certificate in accordance with an embodiment of the present invention.

Referring to FIG. 9, a flow diagram illustrates a method for renewal. Block 910 provides for an application running with an administrator member ID to register for a PEER_GROUP_EVENT_MEMBERSHIP_AUTHORIZATION event. Block 920 provides that GSM 210, if receiving an online renewal, sets up a graphing direct connection. Block 930 provides that GSM 210, if receiving an offline renewal, receives an offline renewal request record marked for renewal. Block 940 provides for creating a certificate. Block 950 provides for invoking a callback function provided by grouping for notification of events. This function will either return error indicating no registrations or it will send an event to the application.

Block 960 provides that, if no registration is present, GSM 210 checks if a certificate can be renewed without authorization. If GMC can be renewed without authorization, block 970 provides that GSM 210 will renew it. If the GMC can't be renewed, block 980 provides that GSM 210 will discard the renewal request. If registration is present, block 990 provides that GSM 210 will wait for authorization by an application.

Block 992 provides that GSM 210 calls the API SecAuthorizeCreateCertificate using certificate information and a flag indicating whether or not this certificate should be issued. The GSM 210 can be configured to not block indefinitely, waiting for the application's response. Instead, GSM 210 can be configured to timeout if application takes too long. GSM 210 can all so be configured to fail the GMC creation request based on group properties. Block 994 provides that GSM 210 also checks security policies and other information before creating this certificate.

During the connection establishment, group-connect SSP may request an offline renewal certificate by making a call using an GetOfflineRenewalCertificateCallback API. This certificate can be requested for the remote party to which group-connect SSP is connecting. A remote party on receiving this certificate calls SetOfflineRenewalCertificateCallback API to store this certificate.

Secure Publishing

Referring now to FIG. 10, a block diagram illustrates secure publishing in a group. Group 1010 is shown as a group of nodes that wish to publish records 1020, stored on group database 1022. The records 1020 published in group 1010 are secured to prevent malicious group members or malicious users from changing records published by someone else without authorization or publish records that are not authorized. To achieve this, records 1020 are secured before publishing and whenever a record is received from a network 1030. GSM 210 verifies that the record is valid. Graphing 1040 calls GSM 210 for both securing records and validating new records that are received by graphing 1040. GSM 210 provides functions to graphing 1040 that graphing can use to callback into GSM 210. Every record 1020 flows through GSM 210, either while being locally secured or while being validated. GSM 210 caches information of interest during the securing and validation of records 1020.

Also shown in FIG. 10 are GMCs 1050 which are certificates including information. A GMC 1050 is published as a record and is added to the group database. One of the requirements for validating any record is that the publisher's information and credentials should be available. Publisher information can be found on a publisher's GMC 1050. The GMC 1050 contains the publisher's public key and their roles, which are required to validate any record published by any member. Therefore, before publishing any other record, a group member first publishes their GMC in a membership record.

The expiration time of the membership record can be different from the expiration time of the GMC 1050, the expiration time of other records published can be different from both the GMC lifetime and the membership record lifetime. GMC 1050 maintains consistency across at least three different lifetimes so that records do not become invalid when a member's GMC 1050 or membership record expires. The membership record does not stay in the group database if the GMC contained in it has expired. In one embodiment, a relationship between these lifetimes so that all the records in group database always remains valid is provided such that the lifetime of record published is less than or equal to the lifetime of the GMC 1050.

By keeping the records with a lifetime that is less than or equal to the lifetime of a GMC 1050, the membership record is always valid since it will always contain an unexpired GMC. The lifetime restriction of less than or equal to the lifetime of a GMC 1050 also ensures that for every publisher who has a record in database, there is a corresponding membership record that contains a GMC 1050 that can be used by anyone to validate records published by this publisher.

For protection against anyone modifying the records published by group members, all the records can require a signature by their publisher using the private key corresponding to publisher's peer name. The signature can be stored in the record's security data field. Whenever a member receives a record, GSM 210 validates the signature contained in the security data field of the record to verify that the record has not been tampered with.

Group members get GMC's 1050 renewed because either they are about to expire or there are different roles being assigned to the member. When a group member publishes new records using a newer GMC, receivers validate these records against the roles that are present in the newer GMC. The group member publishes a new membership record containing the new GMC. However, older records may still need to be validated using the older GMC. To enable this, there can be multiple membership records present for the same group member.

To validate a record, GSM 210 needs to select the right membership record and use the GMC in the record. As multiple GMC's may be issued to same peer name, the peer name can not be used to differentiate between the GMC's. The serial number is different for every GMC 1050, so GSM 210 puts this serial number in each record's security data field, along with the other security data. When another group member receives a given record, it can select the GMC 1050 that has the right serial number and validate the record against the right GMC 1050.

A GMC 1050 can also be configured to have deferred validation. In deferred validation, GSM 210 publishes a member's GMC before publishing any other record for that member. However, there is a possibility that a GMC will be received by some nodes after a record published by that member due to reasons like changes in network topologies. Therefore, if the GMC to verify some record is not available, the GSM 210 can be configured to maintain key information about the record, such as peer name of publisher and record ID in a set-aside list.

When GSM 210 receives a new membership record, it searches in this set-aside list to see if there is any pending record to be validated for this peer name. If there are some pending records, the GSM 210 calls graphing with the list of record identifiers for these pending records. Graphing will then request validation of these records again. The set aside list can be configured to have an upper limit on the number of entries that can be added. The timeout for culling records can be the same as the timeout that graphing uses to remove stale entries from the set-aside list that graphing maintains and the timeout can be obtained from a registry entry.

API Roles

As discussed above, members in a group are given roles to identify the privileges they have. Authorized users in the group can be configured to be able to define new roles, delete existing roles, and change information associated with existing roles. The following APIs and structures explain different information associated with the role and how to modify roles. It will be understood by those of skill in the art with the benefit of the present disclosure that the following APIs are exemplary in nature and the precise implementation is subject to system requirements and the like.

The APIs provided to manage role information can include PeerCreateRole, PeerDeleteRole, PeerGetRoleInfo, and PeerEnumRoleInfo. PeerCreateRole API creates a new role, which involves publishing a record containing role information. Every role in a given group has a unique role ID and a unique friendly name. PeerDeleteRole API informs all the group members that a role is deleted. Deletion of a role is not trivial, because the role is present inside a GMC and also authorization to publish records may be based on this role. When a role is deleted, the GMC's of all the members who are assigned this role become invalid. This action implies that any records published using these GMC's become invalid, requiring every member to delete all such records from their database. The PeerGetRoleInfo API is used to retrieve role information.

The PeerSetRoleInfo API is used to set role information. PeerSetRoleInfo API is required to change information such as persons authorized to issue this role, classifiers associated with this role. The PeerEnumRoleInfo API enumerates the different roles present in a group. The information is enumerated from the group database.

GSM 210 first checks the authority of the caller to set the role information. If the caller has the authority to set the role information, then an updated record is published containing the new information. The new information provided by the caller replaces the existing role information. The caller should thus be careful when passing this new information. If the intention is just to add new information, then all the old information should be passed in as input as well. Change in classifiers will not be reflected in GMC's until they are renewed. At the time of renewal, the classifiers are updated.

PeerEnumRoles API returns a list of different roles available. The extended information about each of the roles can be obtained by calling PeerGetRoleInfo function.

In view of the many possible embodiments to which the principles of this invention can be applied, what will be recognized is that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method for a member in a group within a graph of interconnected peer nodes to renew a certificate granting privileges, the method comprising:
receiving a request to renew the certificate, wherein the certificate is published in a graph database;
performing renewal of the published certificate according to an authorization from an administrator or based on one or more security policies;
contacting one or more authorized members with a shorter chain in the graph of interconnected nodes before contacting authorized members with a longer chain in the graph of interconnected nodes; and
performing one or more renewal attempts to achieve a chain that is of shorter length, wherein number of renewal attempts are proportional to length of the chain; and if a chain is beyond a predetermined length, performing an offline renewal to shorten the chain.

2. The method of claim 1 wherein more than one authorized member in the group is active, each authorized member in the group enabled to process the renewal request, the method further comprising:
providing each authorized member in the group with a random back-off period prior to attempting to process the renewal request, the random back-off proportional to a length of the chain of the authorized member.

3. A method for ensuring that a publisher of information in a record to a secure group in a graph of interconnected nodes has authority to publish to the secure group, the method comprising:
creating a token for the publisher, the token containing information located in a role assigned to the publisher, the role identifying privileges of the publisher; and
matching the token against a security descriptor for the record to be published, the security descriptor providing a list of rights associated with each role, wherein the token is published in a graph database, the graph database makes available security related information including the published token to each member of the secure group, wherein the graph database enables deferred record validation by enabling a group member to defer until required security information is available to the group member.

4. A computer storage media having computer-executable instructions storage thereon to perform acts for a member in a group within a graph of interconnected peer nodes to renew a certificate granting privileges, the computer-executable instructions performing acts comprising:

receiving a request to renew the certificate, wherein the certificate is published in a graph database;

performing renewal of the published certificate according to an authorization from an administrator or based on one or more security policies;

contacting one or more authorized members with a shorter chain in the graph of interconnected nodes before contacting authorized members with a longer chain in the graph of interconnected nodes; and performing one or more renewal attempts to achieve a chain that is of shorter length, wherein number of renewal attempts are proportional to length of the chain; and if a chain is beyond: a predetermined length, performing an offline renewal to shorten the chain.

5. The computer-readable medium of claim 4 wherein more than one authorized member is the group is active, each authorized member in the group enabled to process the renewal request, the method further comprising:

providing each authorized member in the group with a random back-off period prior to attempting to process the renewal request, the random back-off proportional to a length of the chain of the authorized member.

6. A computer storage media having computer-executable instructions stored thereon to perform acts for ensuring that a publisher of information in a record to a secure group in a graph of interconnected nodes has authority to publish to the secure group, the computer-executable instructions performing acts comprising:

creating a token for the publisher, the token containing information located in a role assigned to the publisher, the role identifying privileges of the publisher; and matching the token against a security descriptor tbr the record to be published, the security descriptor providing a list of rights associated with each role, wherein the token is published in a graph database, the graph database makes available security related information including the published token to each member of the secure group;

wherein the graph database enables deferred record validation by enabling a group member to defer until required security information is available to the group member.

* * * * *